April 4, 1939. M. ZAIGER 2,153,224
WINDSHIELD WIPER
Filed Dec. 31, 1934
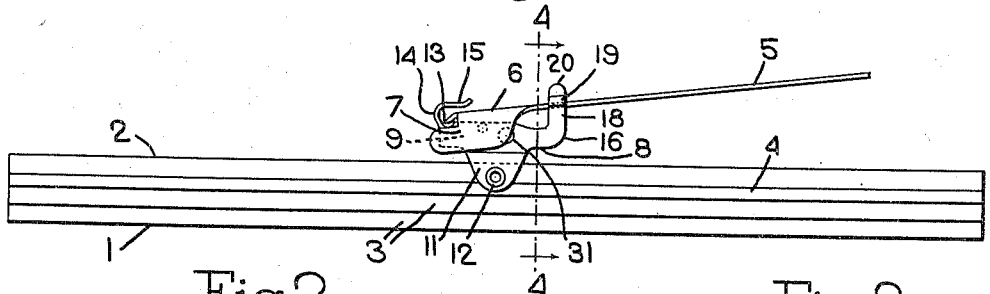
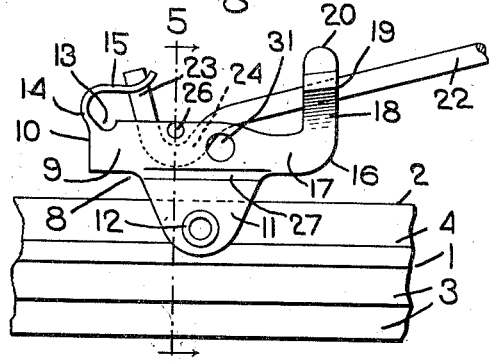
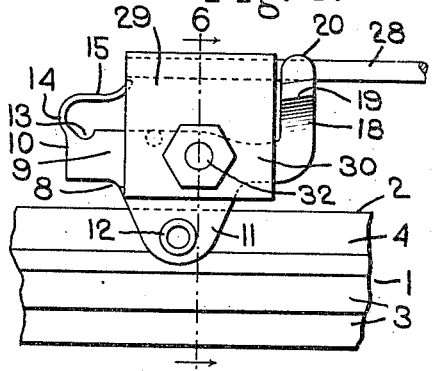
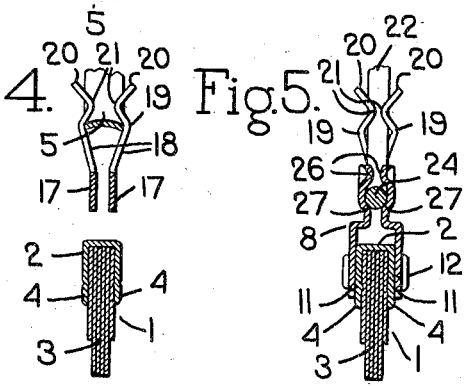
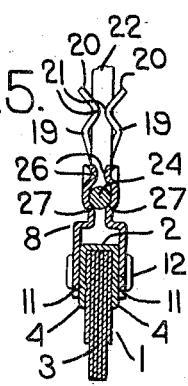
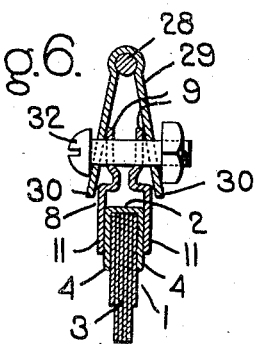
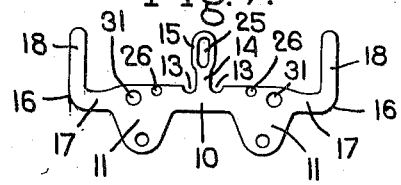
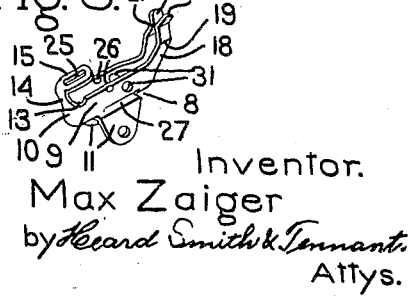
Inventor.
Max Zaiger
by Heard Smith & Tennant.
Attys.

Patented Apr. 4, 1939

2,153,224

UNITED STATES PATENT OFFICE 2,153,224

WINDSHIELD WIPER

Max Zaiger, Swampscott, Mass.

Application December 31, 1934, Serial No. 759,943

2 Claims. (Cl. 15—250)

This invention relates to windshield wipers for automobiles and particularly to the means for attaching the wiper blade to the wiper arm.

There are in common use several different types of windshield wiper arms to which the wiper blades are attached, and one object of my invention is to provide a novel clip for attaching the wiper blade to the wiper arm, which clip is constructed so that it can be attached to any one of the various wiper arms now in use.

Other objects of the invention are to improve generally clips for windshield wiper blades in the particulars hereinafter set forth and then pointed out in the claims.

In the drawing wherein I have illustrated my invention,

Fig. 1 is a side view showing a wiper blade attached to one form of wiper arm by means of my improved clip.

Fig. 2 is a view showing the clip as used to attach the windshield wiper to another form of wiper arm.

Fig. 3 is a similar view showing the clip used in connection with still a third form of wiper arm.

Fig. 4 is an enlarged section on the line 4—4 Fig. 1.

Fig. 5 is a section on the line 5—5 Fig. 2.

Fig. 6 is a section on the line 6—6 Fig. 3.

Fig. 7 is a view of the blank from which the clip is made.

Fig. 8 is a perspective view of the clip.

Referring to the drawing, 1 indicates a wiper blade which may have any suitable or usual construction. This wiper blade is provided with a metal holder 2 which is U-shaped in cross-section and a plurality of wiping strips 3, preferably of soft rubber, which are confined between the legs 4 of the holder.

In Fig. 1, 5 indicates a wiper arm of one well-known type which is made from a strip of resilient metal which is deformed at one end 6 to present the U-shaped portion having the depending gears or flanges 7. The clip embodying the invention by which the wiper blade 1 is attached to the wiper arm is indicated generally at 8. This clip comprises the two spaced side portions 9 which are integrally connected at one end by the connecting bridge 10 and each of which has an ear 11 depending therefrom for attachment to the wiper blade holder. These two ears 11 are spaced apart sufficiently to straddle the holder and are secured thereto by means of a tubular rivet 12 or its equivalent. The clip is formed with a notch 13 in its upper edge adjacent the bridge 10 and said bridge has a finger 14 extending upwardly therefrom, said finger being bent backwardly as shown at 15 to overlie the upper edges of the sides 9. The two sides 9 are provided with the extensions 16, each of which has a portion 17 extending in the direction of the length of the corresponding side 9 and a resilient portion 18 which is directed upwardly at right angles to the portion 17. Each of the upwardly-extending portions 18 is deformed to provide the outwardly-bulging portion 19, and the outwardly-inclined extremity 20.

The clip is constructed so that when it is applied to the arm 5, the two sides 9 will be received between the flanges 7 of the U-shaped end of the arm and the extremity of said arm will underlie the finger 14 as shown in Fig. 1. The extensions 16 are so formed that the resilient upstanding portions thereof embrace the arm 5 somewhat in the rear of the flanges 7, the outwardly-bulging portions 19 providing a space to receive said arm and also constituting seats to engage the edges of the arm. The outwardly-flared extremities 20 provide a flaring throat through which the arm may be forced past the contracted portions 21 into the space between the outwardly-bulging portions 19 when the clip is applied to the wiper arm, the extensions 18 yielding as the wiper arm is forced past said contracted portions. With these extensions 18 of the clip embracing the wiper arm and with the flanges 7 of the arm embracing the sides 9 of the clip, the clip will be firmly held to the arm. The flanges 7 of the wiper arm fit the sides of the clip firm enough so that there is no appreciable flopping action between the clip and the arm during the operation of the wiper.

In Figs. 2 and 5 I have shown the clip as applied to a wiper arm of the rod type. This wiper arm is made from a rod or stiff wire 22 which is bent laterally at its end as shown at 23. When the clip is attached to a wiper arm of this known type the portion 24 of the wiper arm is received between the two sides 9 of the clip, the latter being spaced apart a proper distance to receive the portion 24 of the rod without any appreciable lost motion. The upstanding portions 18 of the extensions 16 embrace the rod 22, the bulging portions 19 fitting snugly against the rod. The finger 15 is provided with an aperture 25 through which the laterally-extending portion 23 of the wiper arm extends. The sides 9 of the clip are deformed to present inwardly-extending projections 26 beneath which the portion 24 of the wiper arm is located. The clip is shown as being further deformed to present the interior ribs 27 on which the portion 24 of the rod rests. As stated above the space between the sides 9 is approximately the same as the diameter of the rod 22 so that said rod fits into this space, and as the rod extends through the aperture 25 in the finger 14, the clip will be securely attached to the arm without any flopping or rocking motion between the arm and the clip.

In Figs. 3 and 6 another well-known form of wiper arm is shown. This comprises a rod 28 having a U-shaped attaching member 29 secured to the end thereof and which is provided with two side pieces or cheek pieces 30. In attaching the clip to this form of wiper arm, the clip is inserted between the two sides or cheek pieces 30 and the rod 28 rests on the outwardly-diverging extremities 20 of the arms 18. The clip is provided with an aperture 31 adapted to receive a bolt or screw 32 which passes through the sides 30 and thus secures the clip to the arm.

I claim:

1. A clip for securing a wiper element to a wiper arm, said clip having two spaced sides connected at one end and adapted to fit between the side flanges of a wiper arm having a U-shaped attaching portion, each side having at said end a notch in its top edge to receive the end of the wiper arm and each side also having at its opposite end an L-shaped resilient extension presenting a resilient arm projecting therefrom, said resilient arms being adapted to embrace the wiper arm, said clip having integral therewith at the end thereof at which the sides are connected a finger extending therefrom which overlies the end of the wiper arm and restrains forward or upward movement thereof relative to the sides of the clip.

2. A clip for securing a wiper blade to a rod type wiper arm having a hooked end, said clip having two spaced sides connected at one end and adapted to receive the hooked end of said arm between said sides, the respective sides having depending ears adapted to straddle the wiper blade and having upstanding resilient extensions for embracing and yieldingly gripping the wiper arm at one end of the clip, and a finger portion at the opposite end of the clip, having an opening therein to receive the tip of the hooked end of the wiper arm.

MAX ZAIGER.